United States Patent
Koziol

[11] 3,812,616
[45] May 28, 1974

[54] PORTABLE GREENHOUSE

[76] Inventor: Leonard L. Koziol, 1109 18th St., West, West Billings, Mont. 59102

[22] Filed: June 26, 1972

[21] Appl. No.: 266,291

[52] U.S. Cl............... 47/17, 47/29, 135/14 D, 242/73.5, 160/243, 135/3
[51] Int. Cl............. A01g 9/00, A01g 13/04
[58] Field of Search............... 47/17, 19, 26, 28–31; 160/5, 171, 242–248, 133, 323, 29, 30, 99, 252, 257; 135/14 D, 15 CF, DIG. 8, DIG. 4, 3

[56] References Cited
UNITED STATES PATENTS

| 78,311 | 5/1868 | Miller | 160/243 |
|---|---|---|---|
| 1,188,411 | 6/1916 | Burrowes | 160/30 X |
| 1,580,287 | 4/1926 | Colle et al. | 47/19 X |
| 2,649,102 | 8/1953 | McDonough | 47/26 X |
| 2,752,928 | 7/1956 | Barker | 47/28.1 |
| 2,820,468 | 1/1958 | Park et al. | 47/28.1 X |
| 2,889,664 | 6/1959 | Olshansky | 47/29 |
| 3,051,185 | 8/1962 | Reynolds | 47/29 X |
| 3,294,150 | 12/1966 | Thomas | 47/17 X |
| 3,682,225 | 8/1972 | Redden | 135/14 D |

FOREIGN PATENTS OR APPLICATIONS

| 905,075 | 9/1962 | Great Britain | 47/26 |
|---|---|---|---|
| 1,291,929 | 4/1969 | Germany | 47/17 |
| 563,865 | 12/1923 | France | 47/17 |
| 838,068 | 6/1960 | Great Britain | 47/29 |
| 847,811 | 9/1960 | Great Britain | 47/28 |
| 137,418 | 9/1952 | Sweden | 47/17 |

Primary Examiner—Robert E. Pulfrey
Assistant Examiner—Eugene H. Eickholt
Attorney, Agent, or Firm—Merchant, Gould, Smith & Edell

[57] ABSTRACT

A portable greenhouse is disclosed having a support structure including a plurality of covered sides with one of the sides being movable between a first position for enclosing the greenhouse and a second position when the side is rolled about a roller member for exposing the inside of the portable greenhouse.

7 Claims, 8 Drawing Figures

PATENTED MAY 28 1974 3,812,616

PATENTED MAY 28 1974  3,812,616

PORTABLE GREENHOUSE

BACKGROUND OF THE INVENTION

This invention relates generally to enclosure-type protectors and more particularly to portable greenhouses for controlling the growth of plants and for protecting the plants during various stages of their growth from the sun, rain, hail, frost, wind, insects, birds, and the like.

Description of the Prior Art: Within the prior art plant protectors are generally quite well known. These protectors generally do an adequate job of covering the plants, see for instance U.S. Pat. No. 1,916,868 issued to Z. Starks and U.S. Pat. No. 2,889,664 issued to E. Olshansky, but there is not provided a method for gaining easy access to the plants for their tending and for their vntilation.

SUMMARY OF THE INVENTION

In accordance with the invention, a portable greenhouse is provided having a basic support structure with a plurality of sides where the sides are enclosed by covers with one of the covers being generally rectangular and having at its bottom edge an elongated rod, whereby the rod can be rotated for rolling the cover therearound for moving the cover from a position completely enclosing the portable greenhouse when the cover is unrolled to a position opening the greenhouse when the cover is rolled about the rollable member and the rolled up cover is held up in place.

According to the invention it is an object to provide a portable greenhouse having one side thereof which is movable so as to either enclose the greehouse or to open the greenhouse for ventilation, planting, watering, and generally tending the plants.

It is a further object to provide a portable greenhouse which is simple and economical to build.

It is a still further object to provide a portable greenhouse having various parts which are economical to fabricate and which can be constructed with parts of various sizes.

It is a still further object of the present invention to provide a portable greenhouse which is easy to assemble and disassemble.

It is a further object of the present invention to provide a portable greenhouse which is long lasting and durable.

It is a further object of the present invention to provide apparatus for easy attachment of the greenhouse covers to the frame structure.

It is a further object of the present invention to provide a portable greenhouse containing apparatus for effective ventilation.

BRIEF DESCRIPTION OF THE DRAWINGS

Other objects and advantages of the invention will become apparent upon reading the following detailed description and upon reference to the drawings, in which.

DETAILED DESCRIPTION OF THE DRAWINGS

Figure 1:
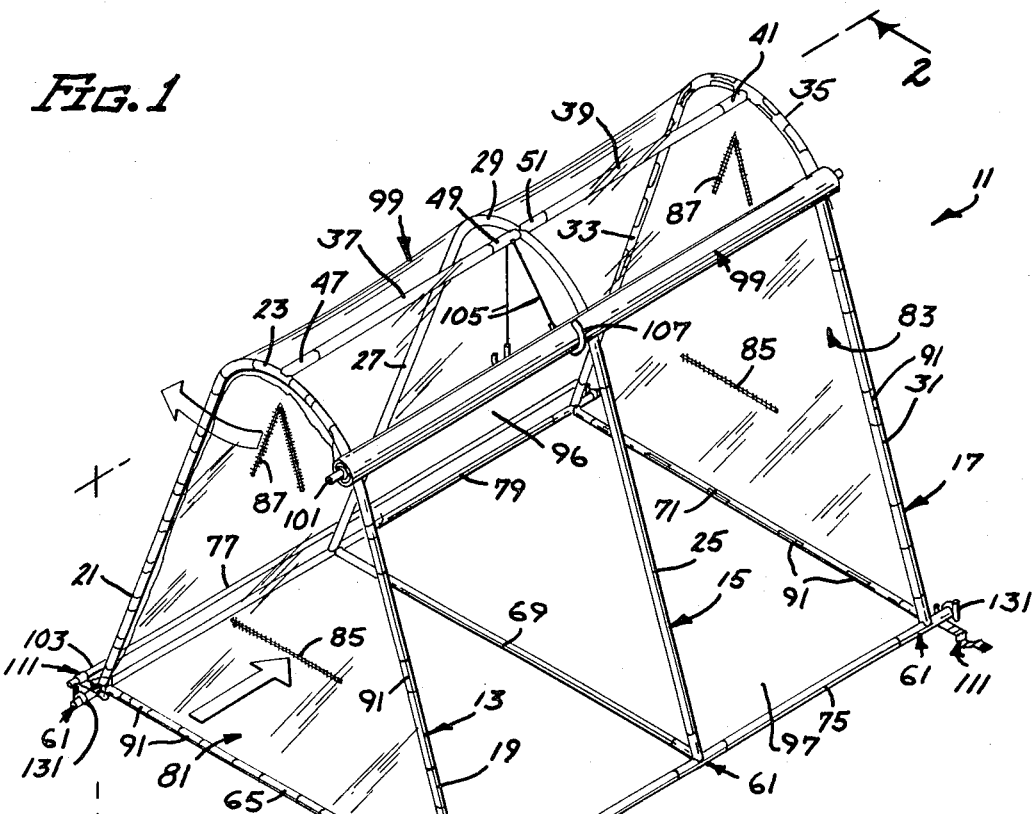
FIG. 1 is a view in perspective of the portable greenhouse of the present invention.
Figure 2:
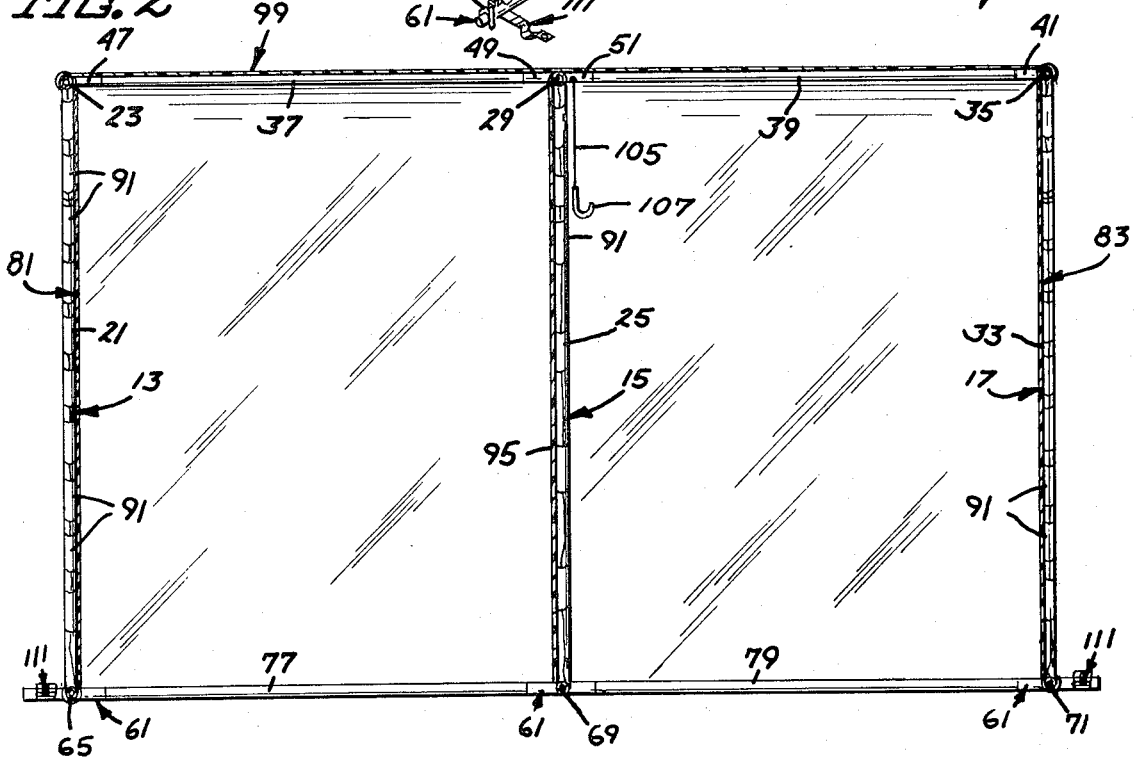
FIG. 2 is a view along line 2—2 of FIG. 1 with an additional cover added to the middle support member.

Referring first to FIGS. 1 and 2 of the drawings there is shown the portable greenhouse, designated generally as numeral 11, of the present invention. As shown, the greenhouse has three generally U-shaped support members designated 13, 15 and 17. U-shaped member 13 has a first leg 19, a second leg 21, and a bight portion 23 from which the legs 19 and 21 diverge downwardly.

U-shaped support 15 has a first leg 25, a second leg 27, and a bight portion 29 connecting legs 25 and 27 in downwardly diverging relationship. U-shaped support 17 has a first leg 31, a second leg 33, and a bight portion 35 which connects legs 31 and 33 in downwardly diverging relationship.

A brace 37 connects the bight portion 23 of U-shaped member 13 with the bight portion 29 of U-shaped member 15, and fixes the U-shaped members 13 and 15 in generally parallel relationship. A second brace member 39 connects the bight portion 29 of U-shaped member 15 with the bight portion 35 of U-shaped member 17, and places U-shaped member 17 in generally parallel relationship with U-shaped member 15 and consequently with U-shaped member 13. All of the legs, the bight portions, and the braces are constructed of ¾ inch outside diameter metal tubing.

Figure 7:
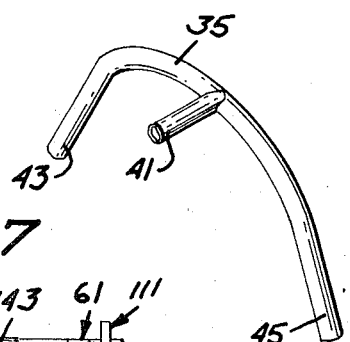
FIG. 7 is a view in perspective of a bight portion of one of the U-shaped support members.

Referring now additionally to FIG. 7 there is shown in greater detail the bight portion 35 of U-shaped member 17. The bight portion 35 is bow shaped and has attached thereto, as by welding, an inwardly directed female type connector 41 which comprises a tubular member. Although not shown, each end 43 and 45 of bight portion 35 also comprise a female type connection as the bight portion 35 is tubular. It should be noted that bight portion 23 is similar to bight portion 35 having an inwardly directed female type connector 47. Bight portion 29 is also similar to the bight portions 23 and 35 but it has a pair of oppositely oriented longitudinally extending female type connectors 49 and 51.

Figure 3:
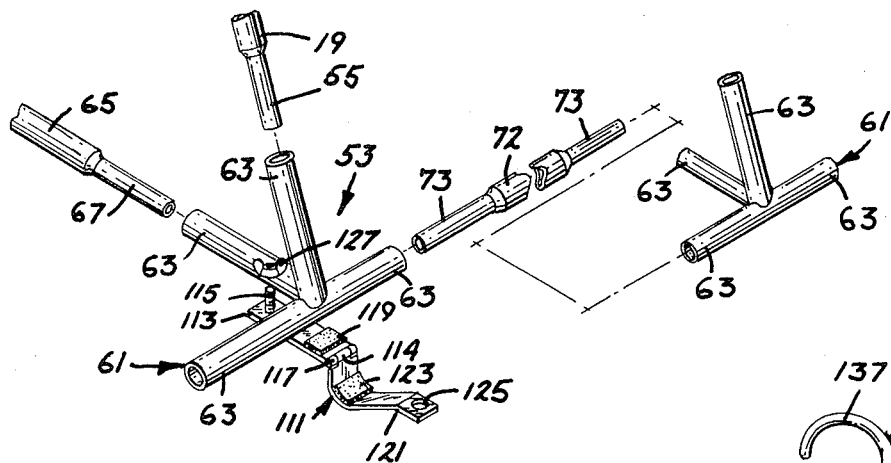
FIG. 3 is a partial view in perspective of the bottom portion of each leg of the support.

Referring now to FIG. 3 there is shown in exploded detail the portion 53 at the end of the leg 19, of U-shaped member 13. Of immediate interest, the lower end 55 of leg 19 can be seen to be constructed with a reduced diameter, and although not shown, the upper end of leg 19 is constructed with a portion having a reduced diameter. The same reduced diameter exists at each end of legs 21, 25, 27, 31 and 33. Additionally, brace 37 has reduced diameter ends for insertion within female members 47 and 49, and brace 39 has reduced diameter ends for insertion within female members 41 and 51. At each end 43 and 45 of bight portion 35, legs 33 and 31 respectively are insertable, for unnumbered ends of bight portion 29 legs 25 and 27 are insertable, and for the unnumbered ends of bight portion 23 legs 19 and 21 are insertable.

Referring now again to FIG. 3 in conjunction with FIG. 1 it can be seen that the portion 53 has a multi-legged connector 61. Connector 61 contains four female type connectors 63 attached together as by welding whose function will be described. It should be noted with reference to FIG. 1 that a multi-legged connector 61 exists at the end of each of the ends of the legs of each U-shaped member. A laterally extending base brace 65 is shown in FIGS. 1 and 3 extending between the multi-legged connectors 61 at the end of each leg 19 and 21 of U-shaped member 13. Brace 65 has reduced diameter ends 67 for insertion within an inwardly directed female connector element 63 of multi-legged connector 61. It should be appreciated that a base brace 69 extending laterally between connectors 61 on the ends of the legs 25 and 27 of U-shaped member 15 also has reduced diameter ends for insertion within the female type connectors 63 of multi-legged connectors 61. Also, laterally extending base brace 71 has reduced diameter ends for insertion within the female type connector 63 of the multi-legged connector 61 at the ends of the legs 31 and 33 of U-shaped member 17. Also shown is a longitudinally extending brace 72 having reduced diameter ends 73 thereon for insertion within the female connector 63 of the multi-legged connector 61 located at the end of leg 19 of U-shaped member 13, and the female connector 63 of the multi-legged connector 61 located at the end of leg 25 of U-shaped member 15. Longitudinally extending base braces 75, 77 and 79 likewise connect the multi-legged connectors 61 located at ends of the various legs of the U-shaped support members.

On one end of the portable greenhouse 11, a cover 81 covers the area bounded by the legs 19 and 21, the bight portion 23, and brace 65, of the U-shaped member 13. The cover 81 can be constructed of any type of fabric such as transparent plastic reinforced plastic, tent awnings, etc. I have chosen to use a plastic end cover of approximately 6 mils of thickness. An end cover 83 located between legs 31 and 33, bight portion 35, and brace 71 of U-shaped member 17 is similar to cover 81. Both covers 81 and 83 contain a pair of zipper assemblies 85 and 87. Zippers 85 and 87 are nylon and provide air venting, fan venting, or an inspection area function.

Figure 5:
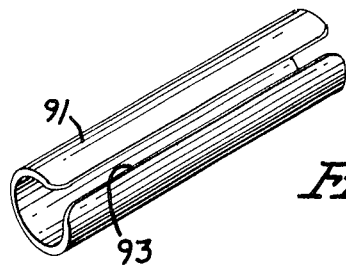
FIG. 5 is a view of a clip used to hold the covers to the support structure of the portable greenhouse.

Referring now to FIG. 5 the clips 91 used to secure the end covers 81 and 83 to their respective U-shaped support members is shown. Clip 91 is constructed from a plastic pipe cut in short sections and having a longitudinally extending slit 93 therein. The inside diameter of clip 91 is approximately one-half inch and thus less than the ¾ inch outside diameter of the legs and bight portion comprising each U-shaped support. FIG. 1 shows a plurality of the clips 91 shown clamped around the legs and bight portions of the U-shaped supports for clamping the covers 81 and 83, near the edges thereof, to the U-shaped supports.

Referring now to FIG. 2 there is shown the portable greenhouse of FIG. 1 along line 2—2 of FIG. 1 having additionally a center cover 95 attached by means of clips 91 to the legs 25 and 27, the bight portion 29, and the brace 69 of support 15. By use of the inside cover 95 the portable greenhouse of the present invention can be used to grow plants of varying characteristics by merely separating them. The cover 95 may also be provided with zippers.

Referring again to FIG. 1, extending over the bight portions of each U-shaped frame, down the rear side 96 of the portable greenhouse along the legs of each U-shaped member, and partially down along the front side 97 of the portable greenhouse along the legs of each U-shaped member is a generally rectangular cover assembly 99. This cover assembly 99 could be constructed of transparent plastic, reinforced plastic, awning, etc. I have chosen to use the same type plastic as used on the end covers 81 and 83. It should be appreciated that the top cover 99 could be made to be two individual covers which extend along the legs of each side 96 and 97 of the greenhouse. Shown on the front side 97 with the cover 99 rolled therearound is a roller member 101 constructed of rigid tubing and attached to the cover 99 near the bottom edge thereof. A roller member 103 is located on the rear side 96 of the portable greenhouse in an attached position which will be described. As seen in FIG. 1 the rolled up cover 99 is attached at the bight portions of each of the U-shaped members for providing air circulation to the plants and for the tending of the plants. For securing the rolled up cover 99 in this position a one-quarter inch diameter plastic cord 105 is secured to the bight portion 29 of U-shaped member 15 either directly or at connector element 61, brace 37, or brace 39, and the cord 105 has at the opposite end thereof a U-shaped holder 107 which is constructed of ⅜ inch diameter steel tubing covered with ⅝ inch diameter rubber hosing. It should be appreciated that any number of holders 107 on cords 105 could be used, and be placed at any position along the bight portions, the connectors, or the braces.

In order to secure the roller member and consequently the cover 99 in a position near the ends of the legs of the U-shaped members, a clamp assembly 111 is provided (best seen in FIG. 3). The clamp assembly 111 has a bottom bracket 113 which is insertable beneath the connector 63 of the multi-legged connector 61. The base plate 113 has an upwardly directed stud 115 at one end thereof and a hinge 117 at the other end thereof. Located near the hinge 117 is a rubber pad 119. Clamp 111 has a top portion 121 hinged about hinge 114 and a rubber pad 123 for cooperation with rubber pad 119 in holding the roller member 101 therebetween, and a hole 125 which is insertable over the stud 115 and held in place by a wing nut 127 for fixedly securing the roller member 101. In FIG. 1 the clamps 111 are shown open on the front side 97 of the portable greenhouse when the cover 99 is in a rolled up position, and the clamps 111 are shown clamping the roller member on the rear side 96 of the greenhouse when the cover 99 is in a rolled down position.

Referring to FIG. 1 it can be seen that when the cover 99 is in the rolled down position as on the rear side 96, in order to more securely hold the cover 99 to the greenhouse additional clips 91 may be used to clip the cover 99 near the outside edges thereof to the legs of the U-shaped support members.

In use, the portable greenhouse 11 can be placed on a concrete slab or other hard surface, staked on the lawn, or driven into the ground. This last alternative would facilitate the elimination of the multi-legged connector elements 61, the longitudinally extending braces 72, 75, 77, and 79, the laterally extending braces 65, 69, and 71, and additionally, if desired, the top braces 37 and 39. When used in this manner, the ends of each of the legs of the U-shaped support member would be merely driven into the ground with the various support members being in substantially parallel relationship. When the portable greenhouse is used in this manner the roller member should be secured in its downward position by means of some weights.

Figure 4:
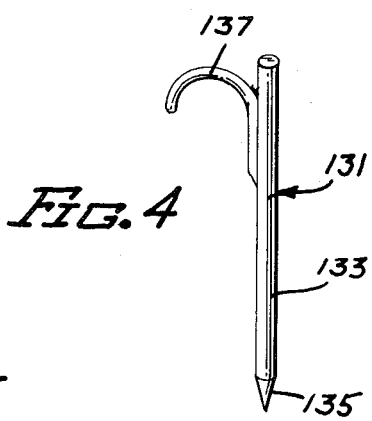
FIG. 4 is a view of a stake used to hold down the portable greenhouse.

When it is desired to utilize all of the connecting elements shown in FIG. 1 and secure the portable greenhouse to a lawn, a hold down stake 131, as shown in FIG. 4, should be used. The hold down stake 131 has a main stake portion 133 with a pointed end 135 at the bottom end thereof and a loop portion 137 at the top thereof which loop portion is sized for extending over the connector elements 63 of each multi-legged connector 61 as shown in FIG. 1.

Figure 6:
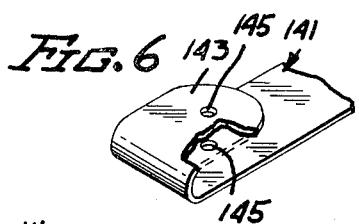
FIG. 6 is a partial view in perspective of a tie down strap.
Figure 8:
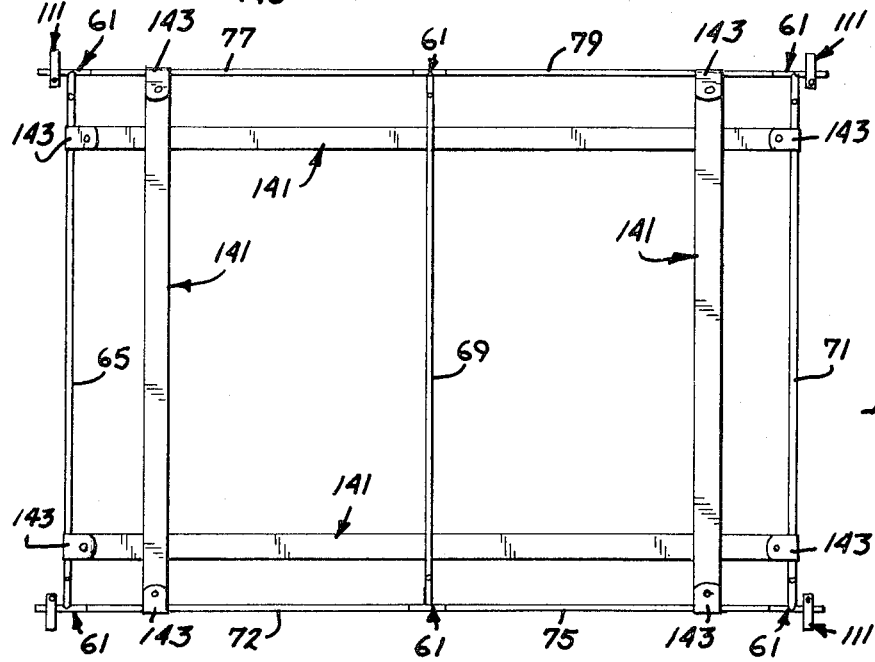
FIG. 8 is a view in top plan of tie down straps attached to the base braces of the portable greenhouse for use under plant racks in holding the greenhouse in a fixed position.

It should be appreciated that the portable greenhouse of the present invention be placed over plants which are growing out of the ground or they can be used in conjunction with plants which are stacked upon racks. If racks are to be used the apparatus shown in FIG. 8 can be utilized to retain the portable greenhouse 11 in position. In FIG. 8 there is shown the base frames 65, 72, 75, 71, 79, 77, and the various connector elements 63 which connect these brace portions. Extending laterally between each oppositely disposed brace are tie down straps 141 having ends thereof which are looped over, as shown in FIG. 6, wherein the loop 143 wraps around the individual base brace and has holes 145 therethrough for the insertion of a nut and bolt arrangement. When the tie down strap arrangement is used the various racks are placed upon the straps 141 which have the effect of retaining the portable greenhouse 11 in a particular position.

Thus it is apparent that there has been provided, in accordance with the invention, a portable greenhouse that fully satisfies the objects set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim

1. A greenhouse-type plant covering comprising:
   a. a first support means having a first downwardly extending leg, a second downwardly extending leg, and a bight portion, said bight portion and said legs defining a first area therebetween;
   b. second support means having a first downwardly extending leg, a second downwardly extending leg, and a bight portion, said bight portion and said legs defining a second area therebetween;
   c. means spacing said first support in generally parallel relationship with said second support;
   d. means covering said first area;
   e. means covering said second area;
   f. a generally rectangular flexible cover having a portion extending between said bight portions, a first edge extending generally parallel with said first leg of said first support, a second edge extending generally parallel with said first leg of said second support, and third edge extending generally perpendicular to said first and second edges;
   g. an elongated member attached along said third edge of said third cover and of a length greater than said third edge, said cover being rollable around said member; and,
   h. means for attaching said elongated member near said bight portions of said support means when said elongated member is rolled up said legs rolling said cover therearound.

2. The greenhouse-type plant covering of claim 1 wherein said means for attaching said member near said bight portions of said support means when said covers roll about said member includes:
   a. a flexible linkage having at one end thereof means for holding said elongated member with said cover therearound; and
   b. means attaching said flexible linkage to said bight portion of one of said supports.

3. The greenhouse-type plant covering of claim 2 wherein said means for holding said member includes a U-shaped bracket.

4. The greenhouse-type plant covering of claim 1 including a third support means having a first downwardly extending leg, a second downwardly extending leg, and a bight portion, said bight portion and said legs defining a third area, said third support means being located intermediate said first and second support means and being spaced in generally parallel relationship therewith by said means spacing said first support in generally parallel relationship with said second support, and means covering said third area.

5. The greenhouse-type plant covering of claim 4 wherein said means for attaching said member near said bight portions of said support means when said cover is rolled about said member includes:
   a. a flexible linkage having at one end thereof means for holding said elongated member with said cover therearound; and
   b. means attaching said flexible linkage to said bight portion of said third support means.

6. The greenhouse-type plant covering of claim 5 wherein said means for holding said member includes a U-shaped bracket.

7. A greenhouse-type plant covering, comprising:
   a. an inverted generally U-shaped tubular support member having a bight portion and first and second outwardly diverging legs having ends, said bight portions and said legs defining a first area therebetween;
   b. a second inverted generally U-shaped tubular support member having a bight portion and first and second outwardly diverging legs having ends, said bight portions and said legs defining a second area therebetween;
   c. a third inverted generally U-shaped tubular support member having a bight portion and first and second outwardly diverging legs having ends, said bight portion and said legs defining a third area therebetween;
   d. a brace rod extending longitudinally between said first, said second, and said third support members at said bight portions, said brace rod spacing said support members in generally parallel relationship with said third support member intermediate said first and second support members.
   e. a first base rod extending longitudinally between said support members along said first legs near said ends;

f. a second base rod extending longitudinally between said support members along said second legs near said ends;
g. a first flexible end cover in the shape of said first area, said cover having a zipper therein;
h. a second flexible end cover in the shape of said second area, said cover having a zipper therein;
i. a plurality of generally tubular snap members having a longitudinally extending slit therein, said snap members having an inside diameter slightly smaller than said outside diameter of said tubular support members for holding said first cover and said second cover to said support members;
j. a generally rectangularly shaped flexible top cover extending over said support members with a first edge along said legs and said bight portion of said first support, a second edge along said legs and said bight portion of said second support, a third edge extending along said ends of said first legs of said first, second, and third supports, and a fourth edge extending along said ends of said second legs of said first, second, and third supports;
k. a first longitudinally extending roller member attached along said third edge of said top cover and a second longitudinally extending roller member attached along said fourth edge of said top cover, said top cover being rollable about said roller members;
l. a plurality of generally tubular snap members having a longitudinally extending slit therein, said snap members having an inside diameter slightly smaller than the outside diameter of said tubular support members, for attaching said top cover to said legs and said bight portion of said first and second support members when said elongated members are in an unrolled position with respect to said generally rectangular flexible cover; and
m. a flexible linkage attached at one end thereof to said bight portion of said third support and having a U-shaped bracket at the other end thereof for attaching said roller member with said cover therearound near said bight portions of said supports.

* * * * *